Oct. 4, 1955  T. B. ALLISON  2,719,610
VEHICLE PLATFORM
Filed Oct. 29, 1952
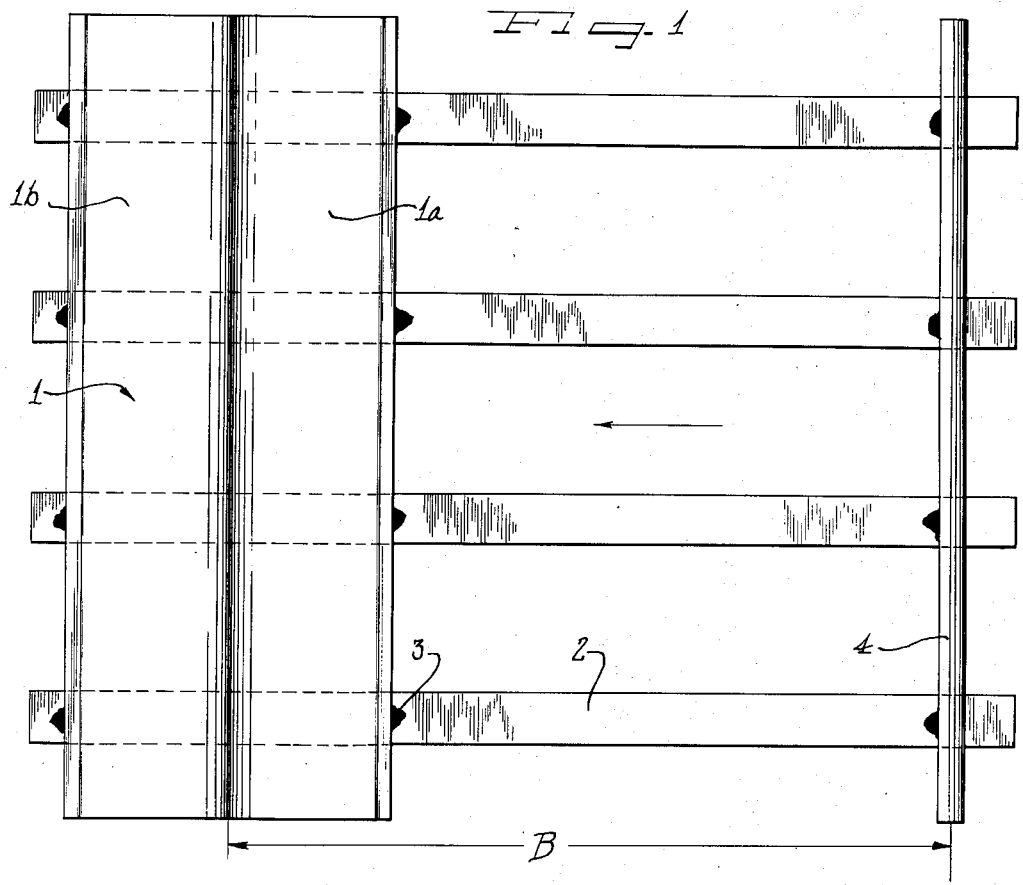
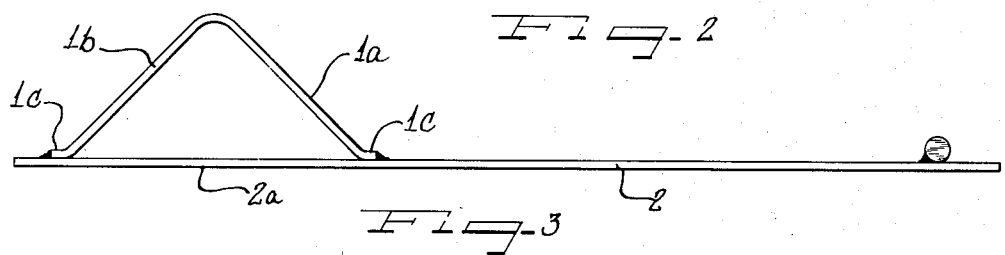
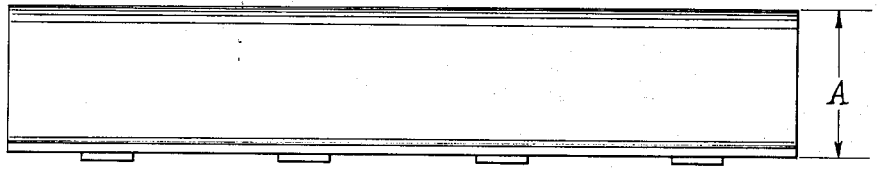
Inventor
Truman B. Allison

United States Patent Office 2,719,610
Patented Oct. 4, 1955

2,719,610

VEHICLE PLATFORM

Truman B. Allison, Elyria, Ohio

Application October 29, 1952, Serial No. 317,480

3 Claims. (Cl. 188—32)

This invention relates to vehicle platforms and is particularly concerned with platforms of the type adapted to support a vehicle against accidental movement in either direction.

The proper parking of vehicles on slightly inclined surfaces, as well as the positive retention of the vehicle in a located position in a parking spot have long been problems in the automotive field. The problem of properly positioning the automobile in a garage or with respect to other fixed objects is a continuing one and in fact is becoming more aggravated since modern automobiles are continually becoming wider and slightly longer. This enlargement of the vehicle has a tendency to make the requirements of parking far more exacting, especially when parking in garages or other buildings designed for the storage of automotive vehicles built some years ago.

Further, it is desirable that an automobile be parked in its emergency brake-released position and without the transmission in gear, conditions which are generally impossible in ordinary parking situations even when parking on the level since there is always a fear that the car will be inadvertently moved slightly and begin rolling, thereby causing possible damage to the vehicle and nearby objects.

In view of these fears it has been the custom to use the emergency brake for maintaining the automobile in a parked condition. This practice, however, has caused difficulty especially in northern climates where there is a decided tendency for brake shoes which are left in contact with the wheel drums to freeze in that position thereby locking the drive of the vehicle.

It is therefore an object of the present invention to provide a simple, convenient, retaining means for co-operation with the vehicle to retain it in a parked position and to aid the parking of the vehicle in an exact position initially.

Another object of the present invention is the provision of an abutment means which will positively prevent the operation of the vehicle past a certain position on the road or floor.

Still another object of the present invention is the provision of a warning means which will forewarn the operator of the vehicle that he is approaching the limit stop abutment.

Yet another object of the present invention is the provision of a vehicle holding means which will prevent retrograde movement of the vehicle as well as ahead movement of the vehicle.

A feature of the present invention is the provision of means between the restraining mechanisms upon which the vehicle may rest to thereby cause the abutments to remain absolutely stationary.

Another feature of the present invention is the provision of a light-weight, portable vehicle platform which can be utilized anywhere to prevent inadvertent movement of the vehicle from a parked position.

Yet another object of the present invention is the provision of a vehicle platform for use in positively retaining parked vehicles in a parked, immovable, condition and which comprises a one piece mechanism which may be carried about by the user and which does not require fastening to the floor surface in order to accomplish its purpose.

Still other and further objects of the present invention will become apparent to those skilled in the art on examination of the drawings herewith attached wherein a preferred embodiment of the invention is shown by way of illustrative example only.

On the drawings:

Figure 1 is a plan view of the vehicle platform of the present invention.

Figure 2 is a side elevation of the platform of Figure 1.

Figure 3 is an end elevation view of the vehicle platform shown in Figure 1 and viewed from the left in that figure.

As shown on the drawings:

The apparatus of the present invention, which comprises a vehicle platform and which I prefer to call a "stay-stop" in view of its combination of these functions, comprises a stop member 1 which is securely affixed to longitudinal strips 2 by means of welding or any other equivalent fastening means. As may be clearly seen from Figure 2, the abutment stop 1 comprises a triangular channel member having legs 1a and 1b which are preferably deformed slightly outwardly as at 1c to lie parallel to the strips 2. The parallel members 1c are then welded as at 3 or affixed in other conventional manner such as by bolts or rivets. Where welding is used, it is, of course, possible to eliminate the portions 1c since the weld could as easily be placed between the strips 2 and the legs 1a and 1b directly.

At the other end of the strips 2 from the stop abutment 1, I have positioned a bar 4. This bar is of a relatively small diameter compared to the dimensions of the abutment 1 and is preferably approximately one-half inch in diameter when the device is to be used with the common passenger vehicles in use today. The bar 4 is likewise fastened to the strips 2 by any conventional means. However, the shape of bar makes welding a particularly satisfactory method of fastening and it is therefore the preferred method. It is to be understood, however, that the bar 4 could be replaced by a transverse member of other than circular configuration, a step which would possibly make other fastening means such as bolting more practicable.

As will be clear from Figures 1 and 2 the abutment stop 1 is, in the assembled condition of the apparatus, triangular in cross-section. This triangle is made up of the legs 1a, 1b and the base 2a, with the corners between the legs 1a and 1b and the strips 2a being positively rigidly secured. As is well known, this triangular form is the strongest and most rigid construction known, and it has been found that it is not possible to flatten out the legs 1a and 1b or otherwise deform the abutment by the impact against the leg 1a by the automobile.

The positioning of the relative parts is necessarily somewhat different depending on the diameter of the wheels on the vehicle used with the stay-stop of the present invention. It is intended that the dimension A of Figure 3 and the dimension B on Figure 1 be such that when the automotive vehicle wheel is positioned on the strips 2 the wheel will rest on the leg 1a and will rest on the bar 4 with the actual weight of the vehicle being placed on the strips 2 between the members 1 and 4.

It has been found that in use with modern vehicles having tires of a size in the neighborhood of 30 inches in diameter that dimensions of B equal approximately 14 or 15 inches and A equals 3 inches is entirely satisfactory. Of course, as the wheel diameter increases, the distance between the dimension B must be increased slightly in order to retain the member 4 in contact with the wheel.

I have found it satisfactory to place the strips 2 about 3 inches apart. This dimension permits the tire tread to contact fully at least one of the support strips 2 so that it is impossible for the vehicle wheel to be placed between the strips and thereby to miss the strips altogether. At the same time, due to the spacing of the strips and their small width, the tire will contact not only the strip but the ground or floor immediately adjacent thereto thereby preventing lateral movement of the platform when loaded. The number of strips 2 utilized, as well as the length of the members 1 and 4 used, is a matter of choice and depends more on the ability of driver than anything else. If it is desired that the stay-stop be used by the general public, it is desirable that the members 1 and 4 be about one and one-half feet long so that there would be no danger of the vehicle operator missing the stay-stop entirely when he parks the vehicle.

In operation, the stay-stop is placed on the floor in the vehicle garage or in the parking place elsewhere. The vehicle is then driven onto the platform in the direction of the arrow in Figure 1. As the tire or wheel approaches the platform it first strikes one or more of the strips 2 and immediately thereafter the wheel strikes the abutment bar 4. Since this bar is of a relatively low altitude the wheel will pass over it upon the application of power from the vehicle engine. There is no tendency for the entire platform to slide along the ground since the tires have initially hit the right hand ends of the strips 2 and the entire weight of the front of the vehicle is tending to maintain the strips downwardly against the ground. After the tire passes over the bar 4, it continues until it strikes the leg 1a of the abutment stop 1. Due to the fact that the tire is not a perfect circle, as a result of the weight of the vehicle which provides a flat spot at the bottom of the tire, the center line of the tire can move a substantial distance ahead of the bar 4 without the tire becoming disengaged from the bar.

As explained above, the final position of the wheel is such that the leading edge of the wheel impacts against the leg 1a while the trailing edge of the wheel is still in slight contact with the bar 4 and in which the great part of the weight of the front of the car is carried by the strips 2. In view of the fact that the weight of the car is on the strips 2, it will be impossible for the abutments 1 or 4 to move relative to the ground, the weight of the vehicle and partial contact of the tire with the ground preventing any sliding which is so common when the ordinary vehicle chocks of the prior art are used on relatively smooth floor surfaces.

As may clearly be seen from a consideration of the construction herein disclosed, the use of the stay-stop will prevent the movement of the vehicle past a predetermined forward position even under power from the engine and will prevent retrograde movement of the vehicle except under intentional operation thereof with the motor supplying the power. The lack of moving parts makes the construction of the mechanism very simple and since the platform depends upon the weight of the vehicle itself for maintaining it in its position on the floor or road surface, it may be picked up and transported from place to place if desired without the necessity of fastening it down at the place of use.

While steel is, of course, an acceptable material from which to make the mechanism, modern methods in welding would permit the use of such light weight metals as aluminum and magnesium or alloys thereof. These latter materials possess great strength and are extremely light as well as being resistant to corrosion. While the weight of the entire platform is not too great when it is made of steel, the use of the above-mentioned lighter materials makes the platform readily adapted to being carried in the trunk of the vehicle as a portable stop.

It will thus be seen that I have provided a novel and extremely simple vehicle platform or stay-stop which is portable, which will not slide relative to the ground upon impact by the vehicle and which will positively locate the front of the vehicle relative to the ground upon parking. The bar positively prevents advertent retrograde movement of the vehicle and also operates to act as a warning to the operator of the vehicle since initial impact with the bar 4 will be readily felt by the operator and will indicate to him that the vehicle can move only a few more inches in the forward direction before coming to an absolute stop.

It will be understood that modifications and variations may be effected without departing from the scope of the novel concepts of the present invention.

I claim as my invention:

1. A vehicle locating platform for cooperation with one of the wheels of said vehicle comprising a plurality of thin laterally spaced longitudinally extending platform members having a width less than that of conventional vehicle tires, a first relatively high abutment member having a cross-sectional configuration in the shape of an inverted V the legs of which are fixedly secured to said longitudinally extending platform members and the axis of which extends transversely to the axis of said longitudinal platform members, and a second abutment member comprising a transversely extending member of relatively low height and which is also secured to said longitudinal members near the ends thereof remote from said first abutment.

2. A vehicle wheel platform comprising a longitudinally extending, substantially flat, thin strip of rigid material of a width less than the width of conventional tires having a pair of transversely extending abutment members thereon, the first of said abutments comprising a V-channel member the legs of which are rigidly secured to said strip along spaced lines transversely of said platform, and the second of said abutments comprising a transversely extending strip of relatively small width and height fixedly secured to said longitudinally extending strip adjacent, but inwardly of, the end thereof remote from said first abutment whereby a vehicle wheel being rolled onto said platform will initially engage said remote end of said longitudinal strip prior to engagement with said second abutment and will simultaneously engage the ground adjacent said strip on at least one side thereof to thereby prevent said platform from sliding relative to the ground.

3. A vehicle locating platform comprising a platform member formed of a plurality of spaced longitudinally extending thin strips having a first abutment member secured near one end thereof and a second abutment secured near the other end thereof, said abutments lying transversely of said longitudinal strips, said first abutment comprising a channel member shaped substantially in an inverted V the legs of which are rigidly secured to said strips, and said second abutment comprising a bar of relatively small diameter secured to said strips whereby said first abutment is relatively greater in height than said second abutment and whereby a vehicle tire supported on said platform will rest on at least one of said strips and on the ground immediately adjacent said one strip and between said one strip and the remaining strips thereby preventing sliding between the platform and the supporting ground.

References Cited in the file of this patent

UNITED STATES PATENTS

| | | |
|---|---|---|
| 2,182,044 | Ackerman | Dec. 5, 1939 |
| 2,441,627 | Gregg | May 18, 1948 |
| 2,465,551 | Otterness | Mar. 29, 1949 |
| 2,521,539 | Richardson | Sept. 5, 1950 |
| 2,591,348 | George | Apr. 1, 1952 |

FOREIGN PATENTS

| | | |
|---|---|---|
| 30,298 | Denmark | May 12, 1921 |
| 318,398 | Great Britain | Sept. 5, 1929 |